(12) United States Patent
Kaltenbach et al.

(10) Patent No.: US 9,731,588 B2
(45) Date of Patent: Aug. 15, 2017

(54) HYBRID DRIVE OF A MOTOR VEHICLE AND METHOD FOR OPERATING SAME

(71) Applicant: ZF FRIEDRICHSHAFEN AG, Friedrichshafen (DE)

(72) Inventors: Johannes Kaltenbach, Friedrichshafen (DE); Uwe Griesmeier, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 349 days.

(21) Appl. No.: 14/364,470

(22) PCT Filed: Nov. 5, 2012

(86) PCT No.: PCT/EP2012/071792
§ 371 (c)(1),
(2) Date: Jun. 11, 2014

(87) PCT Pub. No.: WO2013/091968
PCT Pub. Date: Jun. 27, 2013

(65) Prior Publication Data
US 2015/0075324 A1 Mar. 19, 2015

(30) Foreign Application Priority Data
Dec. 21, 2011 (DE) .......................... 10 2011 089 463

(51) Int. Cl.
*B60K 6/38* (2007.10)
*B60K 6/36* (2007.10)
(Continued)

(52) U.S. Cl.
CPC ................. *B60K 6/36* (2013.01); *B60K 6/38* (2013.01); *B60K 6/387* (2013.01); *B60K 6/442* (2013.01);
(Continued)

(58) Field of Classification Search
CPC ....................................................... B60K 6/38
See application file for complete search history.

(56) References Cited

U.S. PATENT DOCUMENTS 7,353,895 B2 *  4/2008  Bitsche ................. B60W 20/30
                                                    180/292
8,480,535 B2 *  7/2013  Tanba ...................... B60K 6/38
                                                    180/338
(Continued)

FOREIGN PATENT DOCUMENTS

DE   10 2008 041565 A1   3/2010
DE   10 2010 004711 A1   7/2011
(Continued)

OTHER PUBLICATIONS

International Search Report issued Jan. 24, 2013 in International Application No. PCT/EP2012/071792.

*Primary Examiner* — William Kelleher
*Assistant Examiner* — Gregory T Prather
(74) *Attorney, Agent, or Firm* — Brinks Gilson & Lione

(57) ABSTRACT

A hybrid drive of a motor vehicle has an internal combustion engine, an electric machine, and a transmission. The transmission is a multi-stage shifting transmission including two subtransmissions, each of which has a separate input shaft and a common output shaft. The first input shaft of a first subtransmission can be coupled to the internal combustion engine via a friction-locking clutch in such a way that when the clutch is engaged the internal combustion engine is coupled to the first input shaft and thus to the first subtransmission, and when the clutch is disengaged the internal combustion engine is decoupled from the first input shaft and thus decoupled from the first subtransmission. A second input shaft of a second subtransmission is rigidly coupled to the electric machine, and both input shafts can be coupled (Continued)

selectively to the common output shaft via form-locking shift elements of the subtransmissions.

20 Claims, 1 Drawing Sheet

(51) Int. Cl.
*B60K 6/387* (2007.10)
*B60K 6/48* (2007.10)
*B60K 6/547* (2007.10)
*B60W 10/06* (2006.01)
*B60W 10/08* (2006.01)
*B60W 20/00* (2016.01)
*B60W 30/19* (2012.01)
*B60K 6/442* (2007.10)
*F16H 57/02* (2012.01)
*B60W 10/113* (2012.01)
*F16H 3/097* (2006.01)
*F16H 3/093* (2006.01)

(52) U.S. Cl.
CPC ............... *B60K 6/48* (2013.01); *B60K 6/547* (2013.01); *B60W 10/06* (2013.01); *B60W 10/08* (2013.01); *B60W 20/00* (2013.01); *B60W 30/19* (2013.01); *F16H 57/02* (2013.01); *B60K 2006/4825* (2013.01); *B60W 10/113* (2013.01); *B60Y 2400/421* (2013.01); *F16H 3/097* (2013.01); *F16H 2003/0933* (2013.01); *F16H 2057/02034* (2013.01); *F16H 2200/0056* (2013.01); *F16H 2306/48* (2013.01); *F16H 2312/022* (2013.01); *F16H 2312/06* (2013.01); *Y02T 10/6221* (2013.01); *Y02T 10/6252* (2013.01); *Y02T 10/6286* (2013.01); *Y10S 903/909* (2013.01); *Y10T 74/19014* (2015.01)

(56) References Cited

U.S. PATENT DOCUMENTS

| | | | | |
|---|---|---|---|---|
| 8,505,659 | B2* | 8/2013 | Favaretto | B60K 6/36 |
| | | | | 180/305 |
| 8,771,135 | B2* | 7/2014 | Tanba | B60W 10/06 |
| | | | | 477/5 |
| 8,979,704 | B2* | 3/2015 | Kaltenbach | B60K 6/387 |
| | | | | 180/65.7 |
| 9,222,563 | B2* | 12/2015 | Kaltenbach | B60K 6/387 |
| 9,327,713 | B2* | 5/2016 | Kaltenbach | B60K 6/387 |
| 2006/0130601 | A1 | 6/2006 | Hughes | |
| 2007/0155583 | A1* | 7/2007 | Tabata | B60K 6/387 |
| | | | | 477/37 |
| 2008/0146408 | A1* | 6/2008 | Tabata | B60W 20/10 |
| | | | | 477/35 |
| 2010/0234169 | A1* | 9/2010 | Miyazaki | B60K 6/38 |
| | | | | 477/3 |

FOREIGN PATENT DOCUMENTS

| | | |
|---|---|---|
| DE | 10 2010 028026 A1 | 10/2011 |
| EP | 2 281 727 A1 | 2/2011 |
| WO | 2010/007291 A1 | 1/2010 |

* cited by examiner

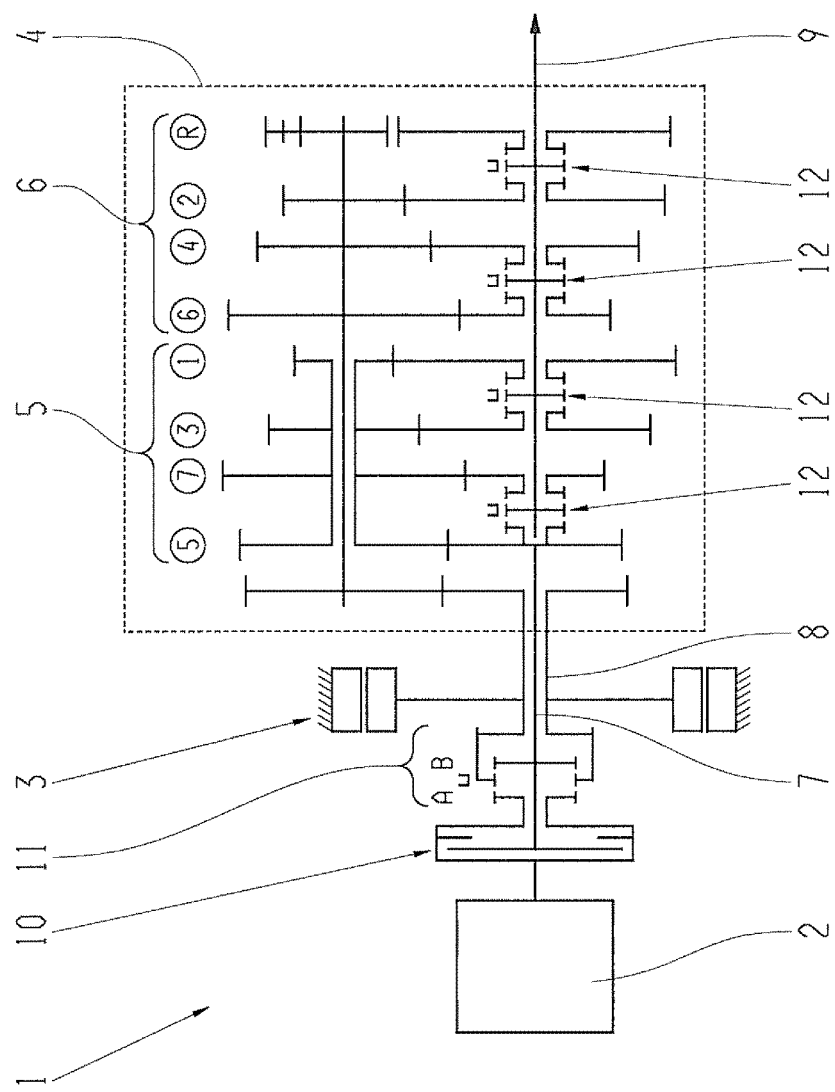

HYBRID DRIVE OF A MOTOR VEHICLE AND METHOD FOR OPERATING SAME

This application is a filing under 35 U.S.C. §371 of International Patent Application PCT/EP2012/071792, filed Nov. 5, 2012, and claims the priority of DE 10 2011 089 463.2, filed Dec. 21, 2011. These applications are incorporated by reference herein in their entirety.

The invention relates to a hybrid drive for a motor vehicle according to the preamble of claim 1. Moreover, the invention relates to methods for operating a hybrid drive of this type.

DE 198 50 549 A1 disclosed a hybrid drive for a motor vehicle, wherein the hybrid drive comprises an internal combustion engine, an electric machine and a transmission designed as a double clutch transmission. The double clutch transmission of the hybrid drive disclosed in DE 198 50 549 A1 has two subtransmissions, each of which has a separate input shaft and a common output shaft, wherein, according to this prior art, a friction-locking clutch is allocated to each input shaft, for coupling the internal combustion engine to the respective input shaft of the respective subtransmission. The subtransmissions of the double clutch transmission according to DE 198 50 549 A1 have form-locking shift elements, by means of which the two input shafts can be selectively coupled to the common output shaft. An electric machine is coupled to at least one input shaft of at least one subtransmission.

Based on this, the present invention addresses the objective of creating a novel hybrid drive for a motor vehicle and methods for operating a hybrid drive of this type.

This objective shall be attained by means of a hybrid drive according to claim 1. According to the invention, the second input shaft of the second subtransmission is attached to multiple form-locking shift elements in such a way that when a first form-locking shift element is engaged the electric machine is coupled to the internal combustion engine and thus the internal combustion engine together with the electric machine is coupled to the second subtransmission, and when a second form-locking shift element is engaged the electric machine is coupled to both input shafts of both subtransmissions and thus the first subtransmission is coupled to the second subtransmission.

In the invention-based hybrid drive, a friction-locking clutch of a subtransmission of the transmission is attached only to one input shaft, to the other input shaft of the other subtransmission form-locking shift elements are attached. Via the first, form-locking shift element, which when engaged couples the electric machine to the internal combustion engine and thus the internal combustion engine together with the electric machine is coupled to the second subtransmission, it is possible to execute a start-up from a generator charging mode of the electric machine, without a delay. Via the second, form-locking shift element, by means of which when engaged the electric machine is also coupled to the first input shaft of the first subtransmission and thus the first subtransmission is coupled to the second subtransmission, it can be ensured that the friction-locking clutch can always be used as decoupler of the internal combustion engine, to be able, for example, during an emergency brake application, to decouple the internal combustion engine even under load in order to prevent the same from stalling. With a single electric machine of the hybrid drive, a plurality of hybrid function can be implemented, for example, charging in neutral, boosting, recuperation and purely electrical driving. Furthermore, the electric machine can be utilized as power shifting element, maintaining tractive force at the output when executing gear shifts.

Preferably, the first form-locking shift element and the second form-locking shift element are combined in one shifting group with a common actuator in such a way that only the first form-locking shift element is engaged or only the second form-locking is engaged or both shift elements are disengaged. With this design it is possible to reduce the required installation space.

Invention-based methods for operating a hybrid drive of this type are defined in claims 4 to 9.

Preferred further developments of the invention are included in the sub-claims and the subsequent description. Embodiments of the invention are explained in greater detail, without being limited thereto, by means of the drawings. It is shown:

FIG. 1 a diagram of an invention-based hybrid drive of a motor vehicle.

FIG. 1 shows a preferred embodiment of an invention-based hybrid drive 1 of a motor vehicle, wherein the hybrid drive 1 comprises an internal combustion engine 2, an electric machine 3 and a transmission 4. The transmission 4 is designed as a multi-stage shifting transmission having two subtransmissions 5 and 6, wherein the two subtransmissions 5 and 6 each have a separate input shaft 7 or 8, respectively, and a common output shaft 9. In the embodiment shown in FIG. 1, the first subtransmission 5 provides the forward gears "1," "3," "5," and "7". In the embodiment shown, the second subtransmission 6 provides the forward gears "2," "4," and "6," and the reverse gear "R".

According to FIG. 1, the transmission 4, having the two subtransmissions 5 and 6, has numerous form-locking shift elements combined to form shifting groups 12, by means of which each of the two input shafts 7 and 8 of the two subtransmissions 5 and 6 can be selectively coupled to the output shaft 9 of the transmission 4, wherein the output shaft 9 of the transmission 4 acts on an output drive.

To an input shaft of a subtransmission of the transmission 4, namely in FIG. 1 the first input shaft 7 of the first subtransmission 5, a friction-locking clutch 10 is attached in such a way that said friction-locking clutch 10, which can also be called a decoupler, is interposed between the internal combustion engine 2 and the first input shaft 7 of the first subtransmission 5. When the friction-locking clutch 10 is engaged, the internal combustion engine 2 is coupled to the first input shaft 7 and thus to the first subtransmission 5. However, when the friction-locking clutch 10 is disengaged, the internal combustion engine 2 is decoupled from the first input shaft 7 and thus from the first subtransmission 5 of the transmission 4.

The only electric machine 3 of the hybrid drive 1 is rigidly coupled to the other input shaft of the other subtransmission, namely in FIG. 1 with the second input shaft 8 of the second subtransmission 6.

At this point, it should be noted that in the preferred embodiment shown the two input shafts 7 and 8 of the two subtransmissions 5 and 6 are disposed coaxially to one another. At the same time, the electric machine 3 engages at the external input shaft 8 of the second subtransmission 6, namely in FIG. 1 directly. However, it is also possible to interpose between this input shaft 8 of the second subtransmission 6 and the electric machine 3 a constant transmission ratio.

In contrast to the embodiment shown, it is also possible to choose an axial-parallel assembly and couple the electric machine to the respective input shaft of the respective subtransmission by means of a spur-gear stage, a belt drive or a chain drive.

The subtransmission of the transmission 4, to the input shaft of which the electric machine 3 is rigidly coupled, i.e., in FIG. 1 the second input shaft 8 of the second subtransmission 6, is not attached to a friction-locking clutch. Instead, the second input shaft 8 of the second subtransmission 6 is attached to multiple form-locking shift elements A and B which, according to FIG. 1, are combined to a shifting group.

When a first form-locking shift element A is engaged, the electric machine 3 is coupled to the internal combustion engine 2 and thus the internal combustion engine 2 together with the electric machine 3 is coupled to the second subtransmission 6, namely to the input shaft 8 of the second subtransmission 6, circumventing the friction-locking clutch 10. When a second from-locking shift element B is engaged, the two input shafts 7 and 8 and thus the two subtransmissions 5 and 6 are coupled, resulting in the fact that the electric machine 3 is coupled to the second input shaft 8 of the second subtransmission 6, as well as to the first input shaft 7 of the first subtransmission 5.

Since either only the first shift element A or only the second shift element B is engaged, both shift elements A and B are preferably combined to the shifting group having a common actuator. As a result, only the first form-locking shift element A is engaged or only the second form-locking shift element B is engaged, or both form-locking shift elements A and B are disengaged.

In particular, the first form-locking shift element A is engaged in the generator mode of the electric machine 3 and thus in the charging mode of the same when in generator mode of the electric machine 3 the speed of the motor vehicle is lower than a limit value, especially when the motor vehicle is at a standstill and the speed of the same amounts to zero. When in the generator mode of the electric machine 3 the speed of the motor vehicle is higher than a limit value, or in the motorized mode of the electric machine 3, the first form-locking shift element A is disengaged.

As a result, for the generator mode of the electric machine 3, and thus the charging mode of the same when the motor vehicle is at a standstill, the first form-locking shift element A is engaged, in the first subtransmission 5 a starting gear is engaged, in the second subtransmission 6 a neutral setting is engaged and the friction-locking clutch 10 is disengaged or engaged maximally as far as the point of contact of the same. For a subsequent start-up or creep drive, the friction-locking clutch 10 can be engaged beyond the point of contact, wherein the start-up or creep drive is terminated when the friction-locking clutch 10 is engaged or adhering.

Consequently, in generator charging mode of the electric machine 3, when the motor vehicle is at a standstill, a start-up or creep drive without a delay is possible, because when the first shift element A is engaged the electric machine 3 is connected to the internal combustion engine 2 with regard to the friction-locking clutch 10. When, in this condition, i.e., when the internal combustion engine 2 and the electric machine 3 are coupled to one another via the first shift element A, the second subtransmission 6 is in neutral setting and the starting gear is engaged in the first subtransmission 5, the clutch 10 is engaged, it is possible to implement immediately a vehicle response, without a delay, namely a start-up or creep drive, without a delay.

As described above, especially in generator mode or charging mode of the electric machine 3, the form-locking shift element A is engaged when the motor vehicle has relatively low speeds, in particular when the motor vehicle is at a standstill.

In other situations, i.e., when in the generator mode of the electric machine 3 the driving speed of the motor vehicle is higher than the limit value, or in the motorized mode of the electric machine 3, the first form-locking shift element A is disengaged and, depending on the requirements or the situation, the second form-locking shift element B is engaged.

When during the drive of the motor vehicle the second form-locking shift element B is engaged, i.e., when both input shafts 7 and 8 of the two subtransmissions 5 and 6 are coupled to one another, the friction-locking clutch 10 always acts as a decoupler of the internal combustion engine 2 so that, for example, during an emergency brake application, the decoupler 10 can be disengaged under load in order to prevent the internal combustion engine 2 from stalling.

When in the transmission 4 a gear change from the first gear of the first subtransmission 5 to a target gear of the second subtransmission 6 should be executed, starting with a combustion-engine drive of the motor vehicle when the friction-locking clutch 10 is engaged and the form-locking shift elements A and B are disengaged, first the target gear of the second subtransmission 6 is synchronized and after synchronization engaged, wherein the synchronization of the target gear of the second subtransmission 6 takes place via a speed-controlled operation of the electric machine 3. Subsequently, in order to ensure a load transference from the internal combustion engine 2 to the electric machine 3, a load is built up temporally overlapping at the electric machine 3 and a load is decreased at the internal combustion engine 2 and optionally the friction-locking clutch 10 is disengaged, wherein subsequently the first gear of the first subtransmission 5 is disengaged. In the process, the second shift element B is synchronized and engaged free of load, wherein the synchronization of the second shift element B can take place, for example, by means of synchronized elements of the second shift element or by means of a transmission brake (not shown) at the first subtransmission 5. Following the process of engaging the second shift element B, a load is decreased temporally overlapping at the electric machine 3 in order to ensure a load transference from the electric machine 3 back to the internal combustion engine 2 and at the internal combustion engine 2 a load is built up and optionally the friction-locking clutch 10 is engaged, provided the same was disengaged before.

This concludes the gear change from the first gear of the first subtransmission 5 to a target gear of the second subtransmission 6, wherein subsequently the distribution of a requested driving torque between internal combustion engine 2 and electric machine 3 takes place according to the requirements of an operating strategy.

For example, the above-mention gear change from the first gear of the first subtransmission 5 to the target gear of the second subtransmission 6 can involve a gear change from the forward gear "1" to the forward gear "2" or from the forward gear "3" to the forward gear "4" or from the forward gear "5" to the forward gear "6".

When, starting with an internal combustion engine drive of the motor vehicle when the friction-locking clutch 10 is engaged, the first form-locking shift element A is disengaged and the second form-locking shift element B is disengaged, a gear change from the first gear of the second subtransmission 6 to a target gear of the first subtransmission 5 is to be executed in the transmission 4, first a load is built up temporally overlapping at the electric machine 3 and a load is decreased at the internal combustion engine 2 in order to ensure a load transference from the internal combustion engine 2 to the electric machine 3. Subsequently, the second form-locking shift element B is disengaged free of load. Optionally the friction-locking clutch 10 is disengaged. Thereafter, the target gear of the first subtransmission 5 is synchronized and engaged, wherein then in order to ensure a load transference from the electric machine 3 back to the internal combustion engine 2 a load is decreased temporally overlapping at the electric machine 3 and a load is built up at the internal combustion engine 2 and optionally the friction-locking clutch 10 is engaged. Subsequently, the first gear of the second subtransmission 6 can be disengaged. When this gear change from the first gear of the second subtransmission 6 to a target gear of the first subtransmission 5 is concluded, another distribution of the requested driving torque between internal combustion engine 2 and electric machine 3 takes place according to the requirements of an operating strategy.

For example, the above-mentioned gear change from the first gear of the second subtransmission 6 to the target gear of the first subtransmission 5 can involve a gear change from the forward gear "2" to the forward gear "3" or from the forward gear "4" to the forward gear "5" or from the forward gear "6" to the forward gear "7".

When, starting with an internal combustion engine drive of the motor vehicle when the friction-locking clutch 10 is engaged and the form-locking shift elements A and B are disengaged, a gear change from a first gear of the first subtransmission 5 to a target gear of the first subtransmission 5 is to be executed in the transmission 4, first an intermediate gear is synchronized and engaged in the second subtransmission 6. Subsequently, in order to ensure a load transference from the internal combustion engine 2 to the electric machine 3, a load is decreased temporally overlapping at the internal combustion engine 2 and a load is built up at the electric machine 3 and optionally the friction-locking clutch is disengaged. Thereafter, the first gear of the first subtransmission 5 is disengaged and the target gear of the same is synchronized and engaged. Then, in order to ensure a load transference from the electric machine 3 back to the internal combustion engine 2, a load is decreased temporally overlapping at the electric machine 3 and a load is built up at the internal combustion engine 2 and optionally the friction-locking clutch 10 is engaged. Subsequently, the previously engaged intermediate gear of the second subtransmission 6 can be disengaged again.

For example, the above-mentioned gear change from the first gear of the first subtransmission 5 to the target gear of the first subtransmission 5 can involve a gear change from the forward gear "1" to the forward gear "3" or from the forward gear "3" to the forward gear "5" or from the forward gear "5" to the forward gear "7". At the same time, as intermediate gear of the second subtransmission 6, the forward gear "2" is engaged for a gear change from the forward gear "1" to the forward gear "3".

It is also possible, to execute in the transmission 4 a gear change from a first gear of the second subtransmission 6 to a target gear of the second subtransmission 6, starting with a combustion-engine drive of the motor vehicle when the friction-locking clutch 10 is engaged, the form-locking shift element A is disengaged and the form-locking shift element B is engaged, wherein for this purpose first a load is built up temporally overlapping at the electric machine 3 and a load is decreased at the internal combustion engine 2, in order to ensure a load transference from the internal combustion engine 2 to the electric machine 3. Subsequently, the second form-locking shift element B is disengaged free of load. Optionally the friction-locking clutch 10 is disengaged.

Subsequently, an intermediate gear is synchronized and engaged in the first subtransmission 5, wherein thereafter a load is decreased temporally overlapping at the electric machine 3 and a load is built up at the internal combustion engine 2 and optionally the friction-locking clutch 10 is engaged, in order to ensure a load transference from the electric machine 3 back to the internal combustion engine 2. Subsequently, the first gear of the second subtransmission 6 is disengaged and the target gear of the second subtransmission 6 is synchronized and engaged. Thereafter, again a load transference from the internal combustion engine 2 to the electric machine 3 by decreasing temporally overlapping a load at the internal combustion engine 2 and building up a load at the electric machine 3 and optionally disengaging the friction-locking clutch 10. Subsequently, the intermediate gear of the first subtransmission 5 is disengaged and the second, form-locking shift element B is synchronized and engaged free of load in order to execute a load transference from the electric machine 3 back to the internal combustion engine. For this purpose, again a load is decreased temporally overlapping at the electric machine 3 and a load is built up at the internal combustion engine 2 and optionally the friction-locking clutch 10 is engaged.

For example, the above-mentioned gear change from the first gear of the second subtransmission 6 to a target gear of the second subtransmission 6 can involve a gear change from the forward gear "2" to the forward gear "4" or from the forward gear "4" to the forward gear "6". At the same time, as intermediate gear of the first subtransmission 5, the forward gear "3" is engaged for a gear change from the forward gear "2" to the forward gear "4".

It should be noted at this point that the gear allocation of the gears to the subtransmissions 5 and 6 of the transmission 4 can differ from the one shown in FIG. 1. It is therefore not absolutely necessary that the first subtransmission 5 provides odd gears, and the second subtransmission 6 provides the even gears.

However, in order to ensure a power shifting capability via the electric machine 3, the gears of the second subtransmission 6, to the input shaft 8 of which the electric machine 3 is engaged, should not be directly adjacent to one another.

Preferably, the second subtransmission 6, to the input shaft 8 of which the electric machine 3 is engaged, comprises two electrical travel gears by means of which the entire speed range with regard to the electric machine 3 can be covered. Preferably, these are then also used as support gears for gear shifting or gear changes.

During driving operations, the hybrid drive 1 can be operated in such a way that the power flow of the electric machine 3 is only acting via the second subtransmission 6. The internal combustion engine can then be decoupled from the transmission 4 at any time by disengaging the first clutch 10. For subsequently coupling the internal combustion engine again, all gears of the first subtransmission 5 and the current gear of the second subtransmission 6 are available. This is advantageous because the speed of the motor vehicle can change considerably when the internal combustion engine 2 is decoupled, especially during regenerative braking operations so that a lower gear is required for subsequently coupling the internal combustion engine 2 than at the time when the internal combustion engine 2 was decoupled.

REFERENCE CHARACTERS 1 hybrid drive
2 internal combustion engine 3 electric machine
4 transmission
5 first subtransmission
6 second subtransmission
7 first input shaft
8 second input shaft
9 output shaft
10 friction-locking clutch
11 shifting group
12 shifting group
A first form-locking shift element
B second form-locking shift element

The invention claimed is:

1. A hybrid drive of a motor vehicle comprising an internal combustion engine, an electric machine and a transmission, wherein the transmission is a multi-stage shifting transmission comprising:
 a first subtransmission comprising a first input shaft; and
 a second subtransmission comprising a second input shaft, said first and second subtransmissions sharing a common output shaft, said output shaft extending through said first and second subtransmissions, and said output shaft sharing a common axis with at least one of the first input shaft and the second input shaft,
 wherein the first input shaft of the first subtransmission is coupled to the internal combustion engine via a friction-locking clutch in such a way that when the friction-locking clutch is engaged the internal combustion engine is coupled to the first input shaft and thus to the first subtransmission, and when the friction-locking clutch is disengaged the internal combustion engine is decoupled from the first input shaft and thus decoupled from the first subtransmission,
 wherein the second input shaft of the second subtransmission is rigidly coupled to the electric machine and both the first and second input shafts are coupled selectively to the common output shaft via form-locking shift elements of the first and second subtransmissions, and
 wherein the second input shaft of the second subtransmission is attached to first and second form-locking shift elements (A, B) in such a way that when the first form-locking shift element (A) is engaged the electric machine is coupled to the internal combustion engine and thus the internal combustion engine together with the electric machine is coupled to the second subtransmission, and when the second form-locking shift element (B) is engaged the electric machine is coupled to both the first and second input shafts of the first and second subtransmissions and thus the first subtransmission is coupled to the second subtransmission.

2. The hybrid drive according to claim 1, wherein the first form-locking shift element (A) and the second form-locking shift element (B) are combined in one shifting group with a common actuator in such a way that only the first form-locking shift element is engaged or only the second form-locking (B) is engaged or both shift elements (A, B) are disengaged.

3. The hybrid drive according to claim 1, wherein the first and second input shafts are disposed coaxially to one another.

4. A method for operating a hybrid drive for a motor vehicle, the hybrid drive having an internal combustion engine, an electric machine, and a multi-stage shifting transmission with a first subtransmission having a first input shaft and a second subtransmission having a second input shaft, the second input shaft and the first input shaft sharing a common output shaft that is concentric with the first input shaft and the second input shaft, the method comprising:
 engaging a first form-locking shift element (A) when the electric machine is in a generator mode and when a speed of the motor vehicle is lower than a limit value; and
 disengaging the first form-locking shift element (A) when the speed of the motor vehicle is higher than the limit value
 wherein the first input shaft of the first subtransmission is coupled to the internal combustion engine via a friction-locking clutch in such a way that when the friction-locking clutch is engaged the internal combustion engine is coupled to the first input shaft and thus to the first subtransmission, and when the friction-locking clutch is disengaged the internal combustion engine is decoupled from the first input shaft and thus decoupled from the first subtransmission,
 wherein the second input shaft of the second subtransmission is rigidly coupled to the electric machine and both the first and second input shafts are coupled selectively to the common output shaft via form-locking shift elements of the first and second subtransmissions, and
 wherein the second input shaft of the second subtransmission is attached to first and second form-locking shift elements (A, B) in such a way that when the first form-locking shift element (A) is engaged the electric machine is coupled to the internal combustion engine and thus the internal combustion engine together with the electric machine is coupled to the second subtransmission, and when the second form-locking shift element (B) is engaged the electric machine is coupled to both the first and second input shafts of the first and second subtransmissions and thus the first subtransmission is coupled to the second subtransmission.

5. The method of claim 4, further comprising: when the motor vehicle is at a standstill in a generator mode of the electric machine, engaging the first form-locking shift element (A);
 engaging a starting gear in the first subtransmission and engaging a neutral setting in the second subtransmission; and
 engaging the friction-locking clutch maximally as far as a point of contact of the friction-locking clutch,
 wherein for a subsequent start-up or creep drive, the friction-locking clutch is engaged beyond the point of contact, and the start-up or creep drive is terminated when the friction-locking clutch is adhering.

6. The method of claim 4, further comprising:
 starting with an internal combustion engine drive of the motor vehicle when friction-locking clutch is engaged and the first and second form-locking shift elements (A, B) are disengaged, in order to execute a gear change from a first gear of the first subtransmission to a target gear of the second subtransmission;
 synchronizing first the target gear;
 building up a load at the electric machine and decreasing a load at the internal combustion engine in order to provide a load transference from the internal combustion engine to the electric machine;
 subsequently disengaging the first gear and synchronizing the second shift element (B); and
 in order to provide a load transference from the electric machine back to the internal combustion engine, decreasing a load at the electric machine and building up a load at the internal combustion engine.

7. The method of claim 6, further comprising disengaging the friction-locking clutch while the load transfers from the internal combustion engine to the electric machine.

8. The method of claim 6, further comprising engaging the friction-locking clutch while the load transfers from the electric machine to the internal combustion engine.

9. The method of claim 4, wherein the friction-locking clutch is engaged, the first form-locking shift element (A) is disengaged and the second form-locking shift element (B) is engaged, the method further comprising:
   for executing a gear change from a first gear of the second subtransmission to a target gear of the first subtransmission, first building up a load at the electric machine and decreasing a load at the internal combustion engine;
   disengaging the second form-locking shift element (B) in order to provide a load transference from the internal combustion engine to the electric machine, thereafter the target gear being synchronized; and
   subsequently, decreasing a load at the electric machine and building up a load at the internal combustion engine to ensure a load transference from the electric machine back to the internal combustion engine.

10. The method of claim 9, further comprising disengaging the friction-locking clutch in order to provide the load transference from the internal combustion engine to the electric machine.

11. The method of claim 9, further comprising engaging the friction-locking clutch to provide the load transference from the electric machine back to the internal combustion engine.

12. The method of claim 4, wherein the friction-locking clutch is engaged and the form-locking shift elements (A, B) are disengaged, the method further comprising:
   for executing a gear change from a first gear of the first subtransmission to a target gear of the first subtransmission first synchronizing an intermediate gear to be engaged in the second subtransmission;
   subsequently building up a load at the electric machine and decreasing a load at the internal combustion engine to provide a load transference from the internal combustion engine to the electric machine, thereafter the first gear being disengaged and the target gear being synchronized; and
   decreasing a load at the electric machine and building up a load at the internal combustion engine to provide a load transference from the electric machine back to the internal combustion engine.

13. The method of claim 12, further comprising disengaging the friction-locking clutch to provide the load transference from the internal combustion engine to the electric machine.

14. The method of claim 4, wherein the friction-locking clutch is engaged, the first form-locking shift element (A) is disengaged and the second form-locking shift element (B) is engaged, the method further comprising:
   for executing a gear change from a first gear of the second subtransmission to a target gear of the second subtransmission first building up a load at the electric machine and decreasing a load at the internal combustion engine;
   disengaging the second form-locking shift element (B) to provide a load transference from the internal combustion engine to the electric machine;
   subsequently synchronizing an intermediate gear of the first subtransmission to be engaged, then decreasing a load at the electric machine and building up a load at the internal combustion engine to provide a load transference from the electric machine back to the internal combustion engine;
   subsequently disengaging the first gear of the second subtransmission and the target gear of the second subtransmission being synchronized and engaged, thereafter a load being built up at the electric machine and a load being decreased at the internal combustion engine to provide a further load transference from the internal combustion engine to the electric machine;
   disengaging the intermediate gear of the first subtransmission (A) and the second form-locking shift element (B) being synchronized and engaged and;
   subsequently decreasing a load at the electric machine and building up a load at the internal combustion engine to provide a load transference from the electric machine back to the internal combustion engine.

15. The method of claim 14, wherein after the synchronizing the intermediate gear of the first subtransmission, and when the load at the electric machine is decreased and the load at the internal combustion engine is built up, engaging the friction-locking clutch to provide the load transference from the electric machine back to the internal combustion engine.

16. The method of claim 14, wherein after disengaging the intermediate gear of the first subtransmission and the decreasing the load at the electric machine, engaging the friction-locking clutch to provide the load transference from the electric machine back to the internal combustion engine.

17. The method of claim 4, the method further comprising:
   engaging the first form-locking shift element (A) in a generator mode of the electric machine when a speed of the motor vehicle is lower than a limit value; and
   disengaging the first form-locking shift element (A) when the speed of the motor vehicle is higher than the limit value,
   wherein engaging the first form-locking shift element (A) in the generator mode of the electric machine when the motor vehicle is at a standstill.

18. The method of claim 4, the method further comprising:
   engaging the first form-locking shift element (A) in a generator mode of the electric machine when a speed of the motor vehicle is lower than a limit value; and
   disengaging the first form-locking shift element (A) when the speed of the motor vehicle is higher than the limit value, and
   engaging the second form-locking shift element (B) when the speed of the motor vehicle is higher than the limit value.

19. The method of claim 4, the method further comprising:
   engaging the first form-locking shift element (A) in a generator mode of the electric machine when a speed of the motor vehicle is lower than a limit value; and
   disengaging the first form-locking shift element (A) when the speed of the motor vehicle is higher than the limit value.

20. A hybrid drive of a motor vehicle comprising an internal combustion engine, an electric machine and a transmission, the transmission comprising:
   a first subtransmission comprising a first input shaft; and
   a second subtransmission comprising a second input shaft, said first and second subtransmissions sharing a common output shaft, said output shaft extending through said first and second subtransmissions, wherein said common output shaft is coaxial with a gear of the first subtransmission and a gear of the second subtransmission, wherein the gear of the first subtransmission and the gear of the second subtransmission are both configured to couple and decouple from the common output shaft, wherein the first input shaft of the first subtransmission is coupled to the internal combustion engine via a friction-locking clutch in a way that when the friction-locking clutch is engaged, the internal combustion engine is coupled to the first input shaft, and when the friction-locking clutch is disengaged, the internal combustion engine is decoupled from the first input shaft, wherein the second input shaft of the second subtransmission is rigidly coupled to the electric machine and both the first and second input shafts are coupled selectively to the common output shaft via first and second form-locking shift elements of the first and second subtransmissions, wherein the second input shaft of the second subtransmission is attached to the first and second form-locking shift elements (A, B) in such a way that when the first form-locking shift element (A) is engaged, the internal combustion engine together with the electric machine is coupled to the second subtransmission, and when the second form-locking shift element (B) is engaged, the electric machine is coupled to both the first and second input shafts, the first form-locking shift element (A) being engaged in a generator mode of the electric machine when the speed of the motor vehicle is lower than a predetermined value while being disengaged when the speed of the motor vehicle is higher than the predetermined value.

* * * * *